US011358300B2

(12) United States Patent
Grove

(10) Patent No.: US 11,358,300 B2
(45) Date of Patent: Jun. 14, 2022

(54) MULTIFUNCTIONAL BASE FOR POWER ROUTER AND OTHER TOOLS

(71) Applicant: Green Grove Design LLC, Canandaigua, NY (US)

(72) Inventor: Scott Grove, Canandaigua, NY (US)

(73) Assignee: Green Grove Design LLC, Canandaigua, NY (US)

( * ) Notice: Subject to any disclaimer, the term of this patent is extended or adjusted under 35 U.S.C. 154(b) by 0 days.

(21) Appl. No.: 16/294,341

(22) Filed: Mar. 6, 2019

(65) Prior Publication Data

US 2019/0275695 A1 Sep. 12, 2019

Related U.S. Application Data

(60) Provisional application No. 62/639,154, filed on Mar. 6, 2018.

(51) Int. Cl.
| | |
|---|---|
| *B27C 5/10* | (2006.01) |
| *B23Q 9/00* | (2006.01) |
| *B23Q 3/00* | (2006.01) |
| *B23Q 3/18* | (2006.01) |

(52) U.S. Cl.
CPC ............ *B27C 5/10* (2013.01); *B23Q 3/007* (2013.01); *B23Q 3/18* (2013.01); *B23Q 9/0028* (2013.01)

(58) Field of Classification Search
CPC .... B23Q 9/007; B23Q 9/0014; B23Q 9/0021; B23Q 9/0028; B23Q 9/0035; B23Q 9/02; B23Q 9/0071; Y10T 409/306216; Y10T 409/306384; Y10T 409/30644; Y10T 409/306496; Y10T 409/306608; B27C 5/10

See application file for complete search history.

(56) References Cited

U.S. PATENT DOCUMENTS

| | | | | |
|---|---|---|---|---|
| 3,146,675 | A * | 9/1964 | Anderson | B23B 51/05 409/179 |
| 3,454,061 | A * | 7/1969 | Okoniewski | B27D 5/006 144/134.1 |
| RE33,045 | E * | 9/1989 | Gronholz | B23C 3/126 144/154.5 |
| 4,921,023 | A * | 5/1990 | Pempek | B23Q 1/4861 144/136.95 |
| 5,515,611 | A * | 5/1996 | Maldonado | B23Q 9/0021 144/371 |
| 6,752,572 | B2 * | 6/2004 | Talesky | B23Q 9/0021 144/135.2 |
| 7,448,420 | B2 * | 11/2008 | Mair | B27C 1/005 144/136.95 |

(Continued)

OTHER PUBLICATIONS

MobileSolutionsUSA, Perfect Circle—Cut Circles with your Router!—Mobile Solutions, Aug. 4, 2015, https://www.youtube.com/watch?v=UkRh68OC_IM&feature=youtu.be (Year: 2015).*

(Continued)

*Primary Examiner* — Matthew Katcoff
(74) *Attorney, Agent, or Firm* — Lerner, David, Littenberg, Krumholz & Mentlik, LLP

(57) ABSTRACT

A multifunctional base for a router is provided to allow precise and repeatable cuts through the use of a set of adjustable fences, template guides and bushings. The base has reference surfaces to allow precision cuts at set distances from a fence or template.

7 Claims, 19 Drawing Sheets

(56) References Cited

U.S. PATENT DOCUMENTS

| | | | | |
|---|---|---|---|---|
| 8,109,304 | B2* | 2/2012 | Alves | B27C 5/10 |
| | | | | 144/144.1 |
| 9,108,283 | B2* | 8/2015 | Simm | B23Q 9/0014 |
| 10,300,622 | B2* | 5/2019 | Schnell | B23Q 9/0007 |
| 2005/0236069 | A1* | 10/2005 | O'Brien | B27M 3/12 |
| | | | | 144/144.1 |
| 2009/0038460 | A1* | 2/2009 | Fong | B23Q 9/0035 |
| | | | | 83/522.25 |
| 2012/0241047 | A1* | 9/2012 | Kato | B23Q 9/0028 |
| | | | | 144/136.95 |
| 2013/0051951 | A1* | 2/2013 | Friegang | B27D 5/006 |
| | | | | 409/137 |

OTHER PUBLICATIONS

ImagineGrove Woodworking, Mortising with Self-Centering Guide Pins, Feb. 13, 2018, https://www.youtube.com/watch?v=7egHtQXr2kc (Year: 2018).*

Imaginegroove, Introducing the Ultimate Router Base™ System: Easier, Safer, More Precise Routing for All Your Woodworking Projects, https://www.imaginegrove.com/ultimate-router-base-b (Year: 2020).*

ImagineGrove Woodworking, promo3 149, Sep. 20, 2017, https://www.youtube.com/watch?v=RxnerTmR-EM (Year: 2017).*

Redneck DIY, Build a Better Circle Cutting Jig, Apr. 3, 2015, https://www.redneckdiy.com/build-a-better-circle-cutting-jig/ (Year: 2015).*

* cited by examiner

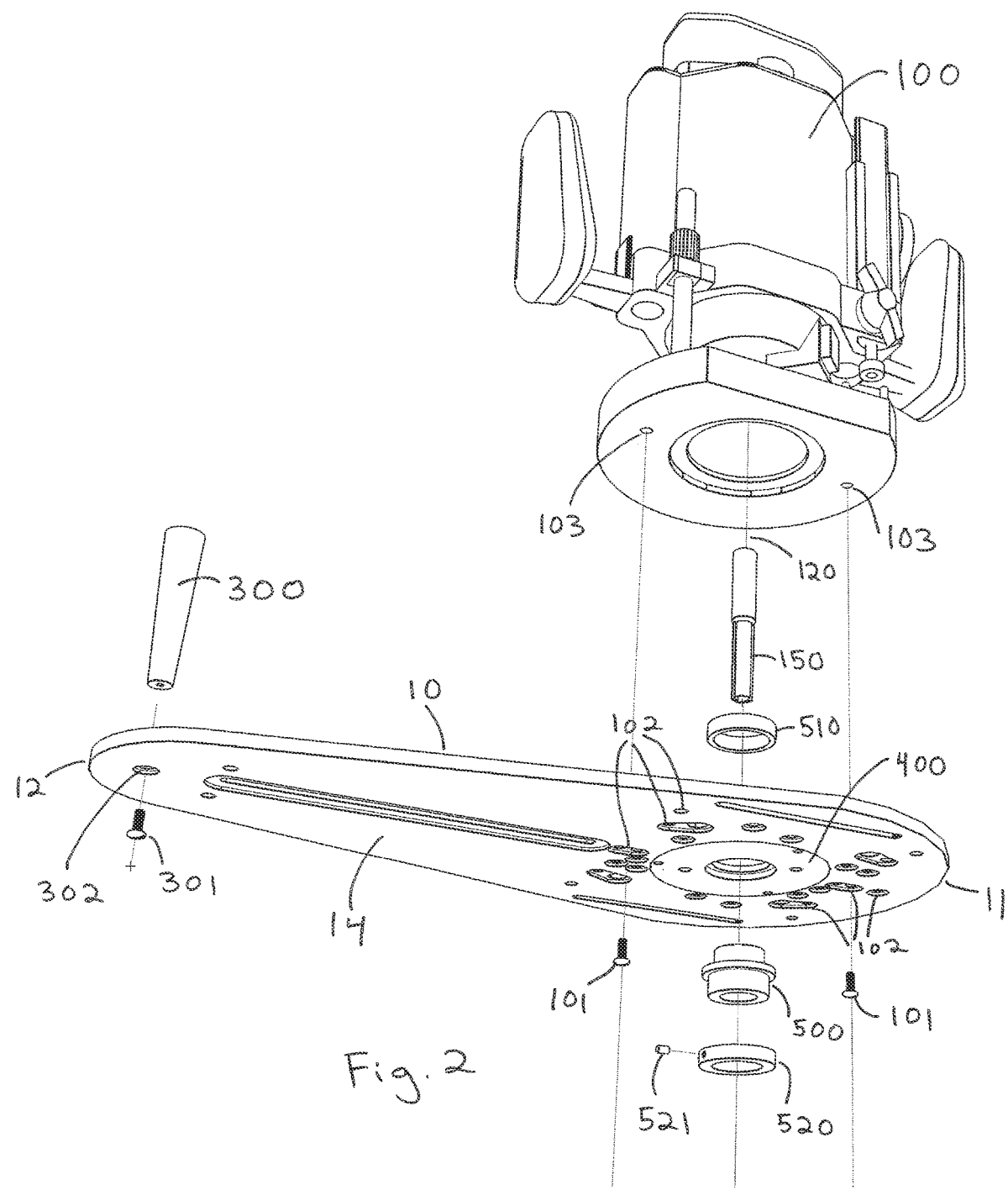

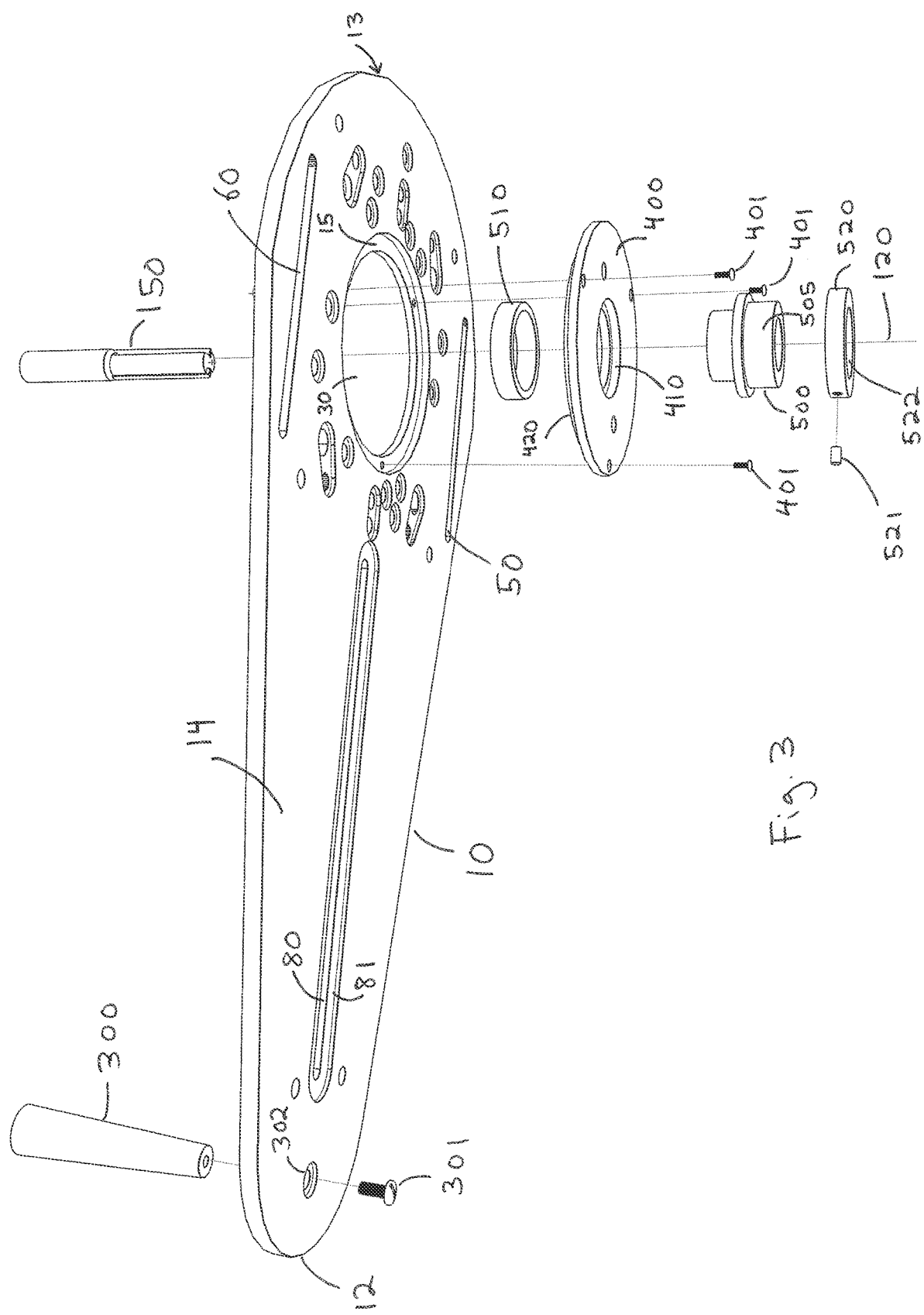

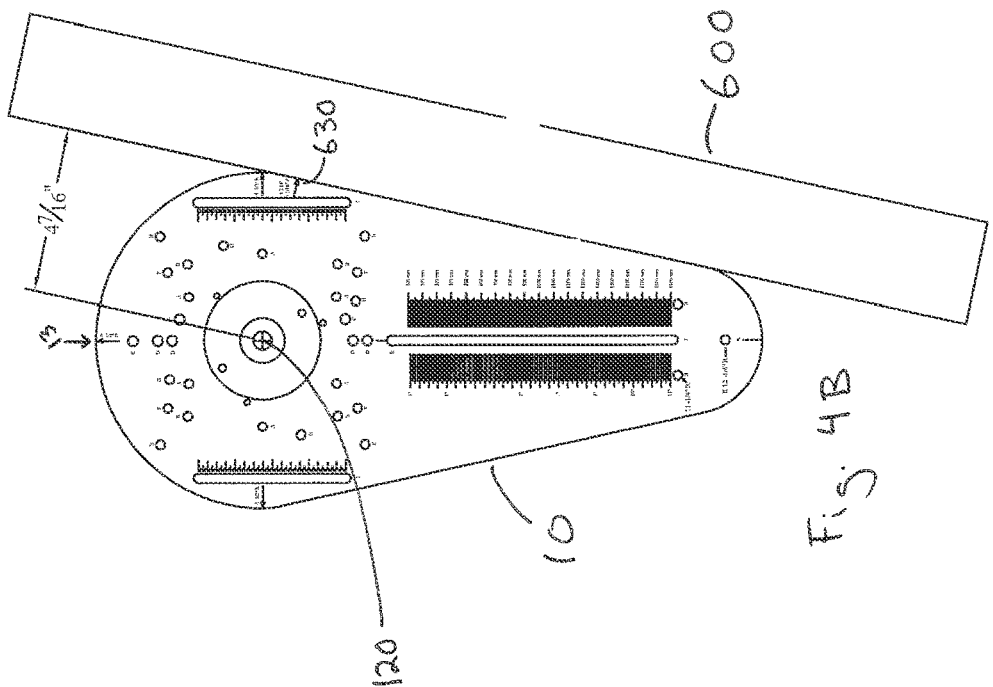
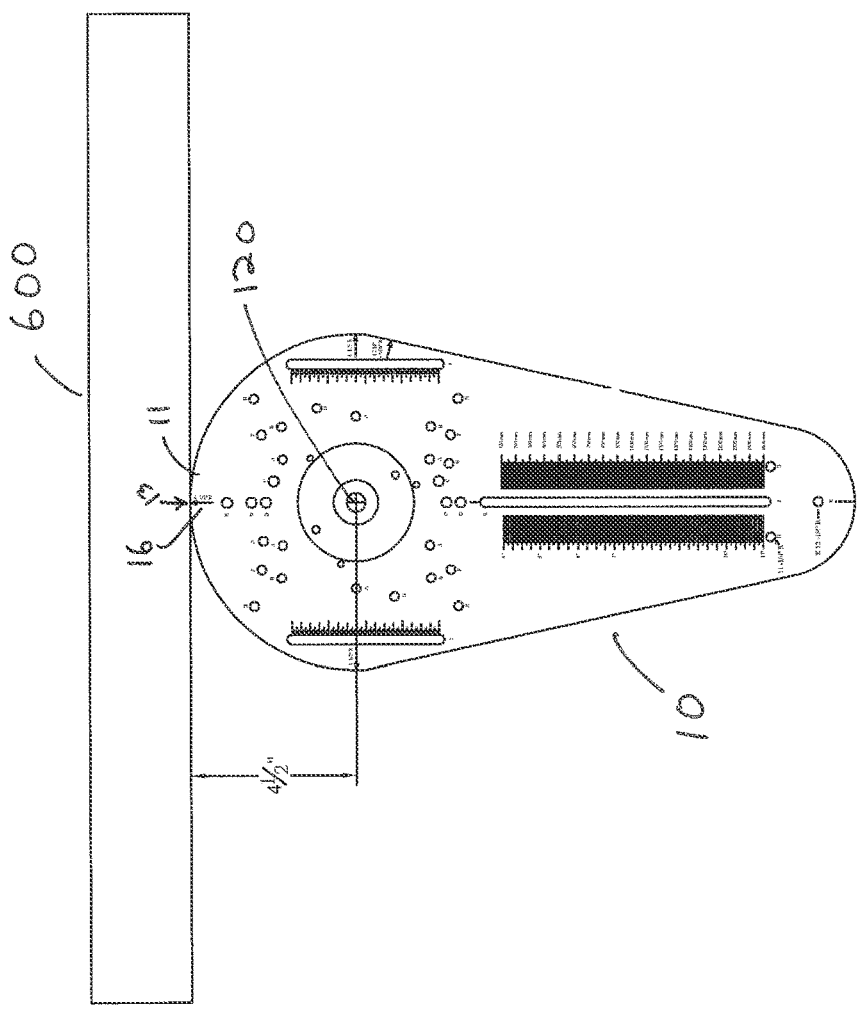

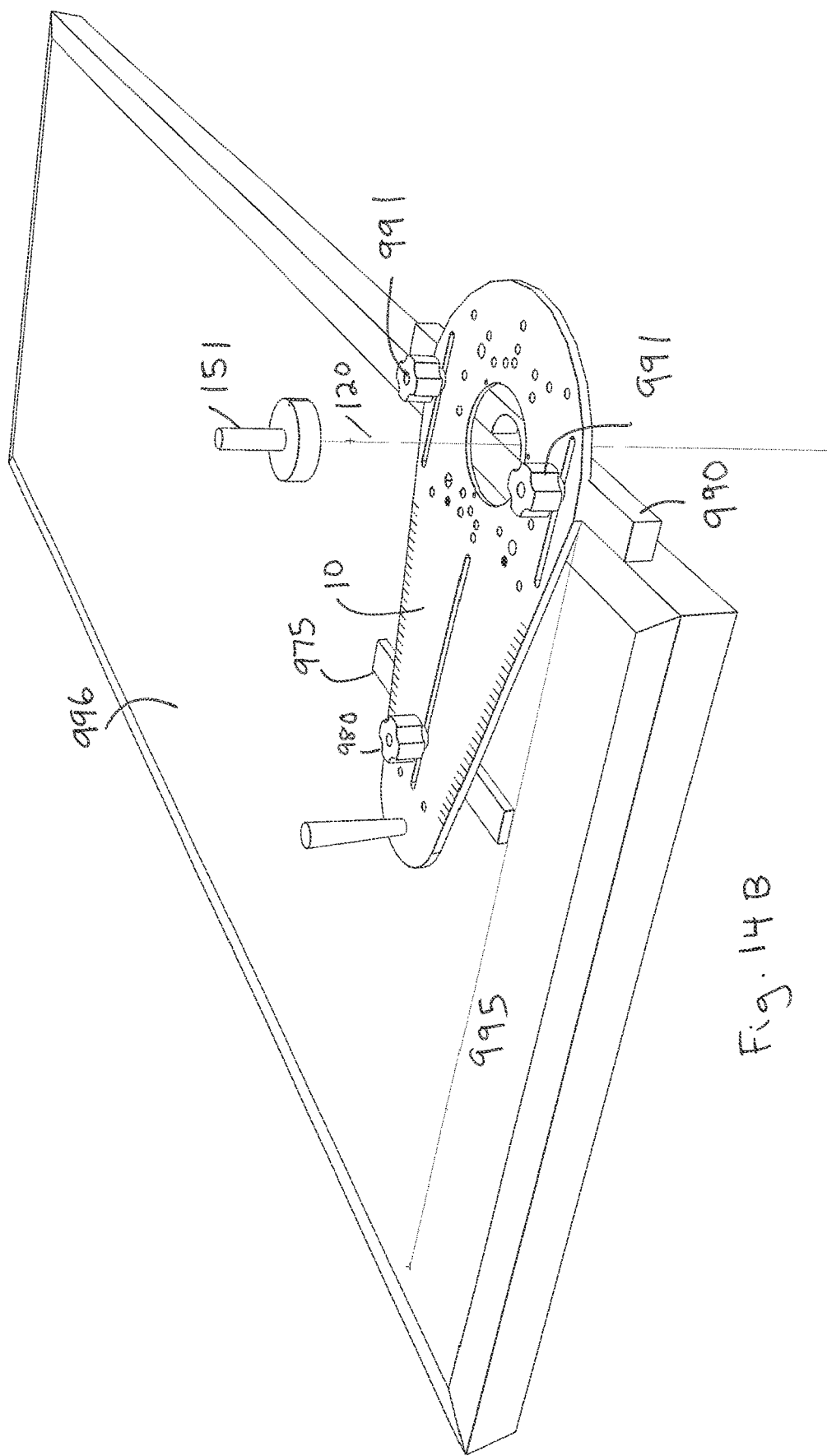

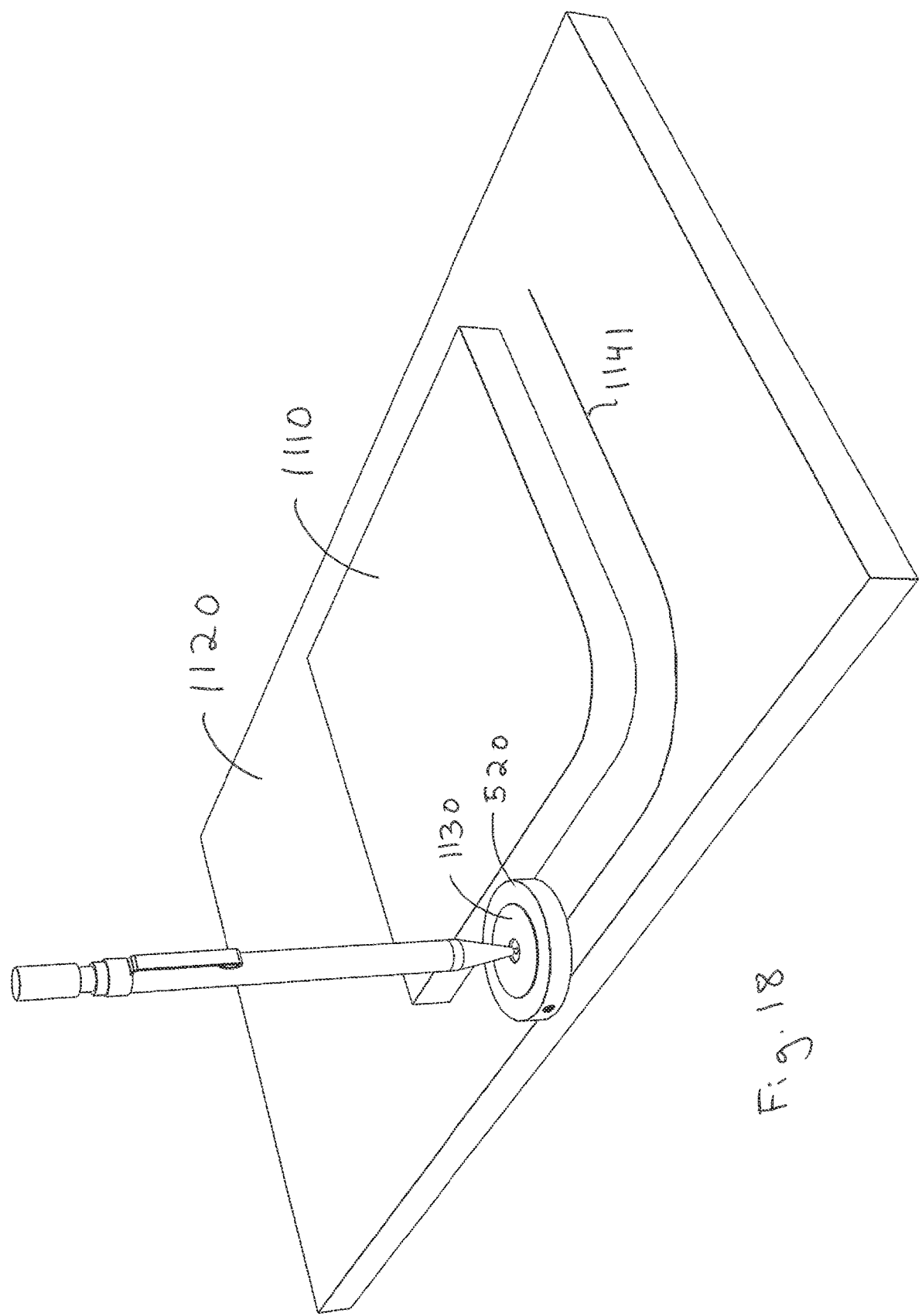

MULTIFUNCTIONAL BASE FOR POWER ROUTER AND OTHER TOOLS

CROSS-REFERENCE TO RELATED APPLICATION

This application claims the benefit of the filing date of U.S. Provisional Patent Application No. 62/639,154, filed Mar. 6, 2018, the disclosure of which is hereby incorporated herein by reference.

BACKGROUND

The present improvement relates to a base for a power tool, and more particularly, to a router base that adds functionality to known existing bases. While the embodiments described herein are in the context of a replacement base for woodworking routers, the aspects described herein can be used as an original equipment supplied base (OEM), and also used as a base for rotary tools other than a router, such as drills, roto-tools, multi-tools, and the like, and for use on materials other than wood, such as plastics, composites, natural or man-made surface materials, and metal.

Routers are commonly used in woodworking to profile edges, form holes and recesses, and cut out items from a template. A router may also be used for other functions, such as surfacing, grooving, edge straightening, and joinery applications such as dovetails, tenons, and the like.

To accomplish these tasks, most routers need accessories, such as larger bases, centering or edge guides, bushing means around the bit, and other attachments to allow the router to precisely cut the intended joinery or accurately remove wood or profile a surface.

Therefore, there exists a need for an improved router base.

BRIEF SUMMARY

It has been recognized that not only do router bases add to the functionality of the router, but by virtue of their size, weight and/or design, a properly designed base can increase the safety of using such a tool.

When using a router, a woodworker often needs multiple bases, different fixtures, or even different routers to perform different functions. This often incurs the downtime of changing bases, and the cost of having multiple bases or multiple routers with dedicated bases.

Presently, no single base satisfactorily performs all of these functions, and improvements have herein been developed that better perform known functions, provide novel, previously unknown functions, or combine functions in unique ways.

The router base of the present improvement can be used for a variety of routing tasks, allows the router to cut and form wood more precisely than previously known, and further enables the router to be used in a safe fashion, reducing risk of injury to the user.

The improvements described herein help a woodworker operate a router with more control and stability and produce accurate perfectly-matched curved joinery, large inlays, and accurately centered inlays, route over a seam easily and make repeatedly, curved profiles, circles and large radius arcs, and quick reduction cuts. It is useful for any professional or hobbyist woodworker who wants to add new dimensions to their creations simply and safely.

With this improved base system, complex shapes, circles, curves, and inlays can be quickly and accurately made, saving time and expense.

A center slot with ruler registered to the spindle center is provided for quick and fine adjustments to a fence or for circle and large arc cuts with the addition of a pivot block or swing arm (which may be part of the base system or made by the user). This slot can also be used for other cutting registered operations where fine adjustments are necessary after initial set up is completed, saving time from trial and error cuts. One exemplar is for use in making repeating flute cuts in a column.

An additional feature of the present technology is to provide means for arranging a guide pin that may be easily adjusted. In known routing methods, a router base is secured to a surface to be routed at a single point, often through a pin being placed into the material to be routed and such pin passing through a hole in the base about the same size as the pin, and offset a distance from the router bit. In use, the router attached to the base is swung around the pin such that the bit moves in an arc so as to cut complete or partial circles, groves, or profiles. The radius of such arc is determined by the distance of the center of the pin to the rotational axis of the router bit. Known bases have many sets of holes to allow different radii to be selected. However, the disadvantage of such bases is that the pin holes must be predrilled in known intervals. If the user needs a radius that is not preset, the user must predrill the hole, requiring drilling and compromising the accuracy and/or integrity of the base.

With known router bases, minor changes in the radius are often difficult to accomplish. For example, if the pin size is 0.25", and a preset hole is at a radius provided of 7.5", a user who wishes a hole at 7.6" cannot drill a second hole next to the 7.5" hole as such hole would overlap, creating slop and inaccuracy in the routing operation. In addition, there is a limit to how many holes a user can drill in a base without running out of room to drill new holes or compromising the integrity of the base.

In some of the exemplar embodiments, a separate fixture can be supplied, or fashioned by the user, to be placed on top of the base to allow for placement of a pivot pin through the center slot, and further being adjustably attached to allow for additional precision of placement of the router bit. In addition, such supplemental fixture or the base can have markings to aid in the fixing of the distance of the pivot hinge (whether imperial or metric incremental markings, or Vernier markings), or having multiple holes to allow for making repeatedly spaced holes, groves or other routing methods.

In an embodiment, a pin attachment mechanism is fixed to the base to be rotated to make circles and circular profiles and groves without the need for drilling holes in such base. In one such embodiment, the base has a slot running in a direction generally axially from the rotational axis of rotation of the bit. A block of wood or other suitable material with two or more holes is placed above the slot. Such block has holes for a pin that would extend through the slot in the base to attach to a the surface to be routed to allow the base to rotate around the pin, either by the pin rotating in the surface, or the base rotating around the pin, or a mixture of both. Bolts are threaded from the underside of the base, through the slot in the base, and into the block. A pin is used to create a rotational pivot point for the base to rotate over the material to be routed. The block can slide along the slot to allow the pin to be moved relative to the router bit axis. In an embodiment, the location of the block is accomplished by tightening the bolts via thumb screws, nuts or similar means, thus allowing for incremental adjustment of the radius of rotation.

In a further preferred embodiment, the base has a scale to allow the radius of rotation to be determined, in actual or relative terms. That is, the scale may be positioned relative to the axis of rotation so that the radius of rotation can be directly read off of the scale. Or the scale can be arranged relative to an indication on or made on the block so that the radius can be "zeroed" and adjustments made incrementally relative to the scale on the base.

Universal mounting holes at the perimeter of the plate allow quick attachment of the base to another surface to create a temporary router table, or allow for leveling skids or a shim sheet. Such holes also allow the attachment of accessories to the base, such as dust collection devices, lights, or further accessory fences.

Side fence slots with scales are provided for quick, repeatable, and easy placement of guide pins or radius pivot pins, or custom add-ons like adjustable fences, for use with circle, large radius and oval cuts as herein described.

In an embodiment, a standard hole is provided for mating with a pivot pin or other fixing structure to form a 12" radius cut using ½" router bit. Various other holes can be provided to work in concert with different bit diameters so a user can create a circle of known diameter without measuring, just by selecting a particular hole in the base for a known bit size.

A further feature of the present technological improvement to known bases is that the base in manufactures to allow making an initial roughing cut and then a parallel finishing cut without the use of modifying the base or changing the arrangement of a guide fence or template.

A base for a woodworking router having a cutting bit is provided, including a generally planer base for attachment to a router, an opening in said base to allow for penetration of a rotating cutting bit of the router, the cutting bit having a center of rotation and a radius from the center of rotation, a first edge of the base having a first distance from the center of rotation of said cutting bit, a second edge of the base having a second distance from the center of rotation of said cutting bit, the difference between said first and said second distances being less than said radius of the cutting bit, wherein the router can be used to take a first pass on a surface indexed off of the first edge, and a second cut on a surface indexed off of the second edge.

A base for a woodworking router is provided, including a base for attachment of a router, the base having a bottom surface, and the router having a cutting bit with a rotational axis when attached to the base the rotational axis is perpendicular to bottom surface of the base, a slot in the base, at least one pin receiving member for rotationally positioning a pin between the base and a workpiece, at least one fastener to releasably secure the pin receiving member to the base, the at least one fastener being able to move within the slot to allow the pin to be positioned at more than one distance from the rotational axis of the router, wherein the pin receiving member can be adjustably secured to the base, so that the base can be rotated around the pin at more than a single radius.

A base for a woodworking router is provided, including a base for attachment of a router with a rotational axis for a bit, the base having a bottom surface and a first end for attachment of a router, and a second end spaced away from the first end, a shim member adjustably secured to the base, wherein when such member is positioned between the first end and the second end, the rotational axis of the router is tilted relative to the bottom surface of the router.

BRIEF DESCRIPTION OF THE DRAWINGS

FIG. 2 is an exploded perspective view of a router, router base, template guides and bushings.

FIG. 3 is an exploded view of the router base with various attachments.

FIG. 4A is a top view of the router base oriented in a first position to a fence.

FIG. 4B is a top view of the router base oriented in a second position to a fence.

FIG. 14B is an exploded perspective view of a router base positioned for an angled cut to the surface of a workpiece.

FIGS. 17 and 18 are perspective views of a drawing disks arranged with bushings.

DETAILED DESCRIPTION

Examples of apparatuses, systems and methods are described herein. It should be understood that the words "example" and "exemplary" are used herein to mean "serving as an example, instance, or illustration." Any embodiment or feature described herein, including those being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

Figure 1:
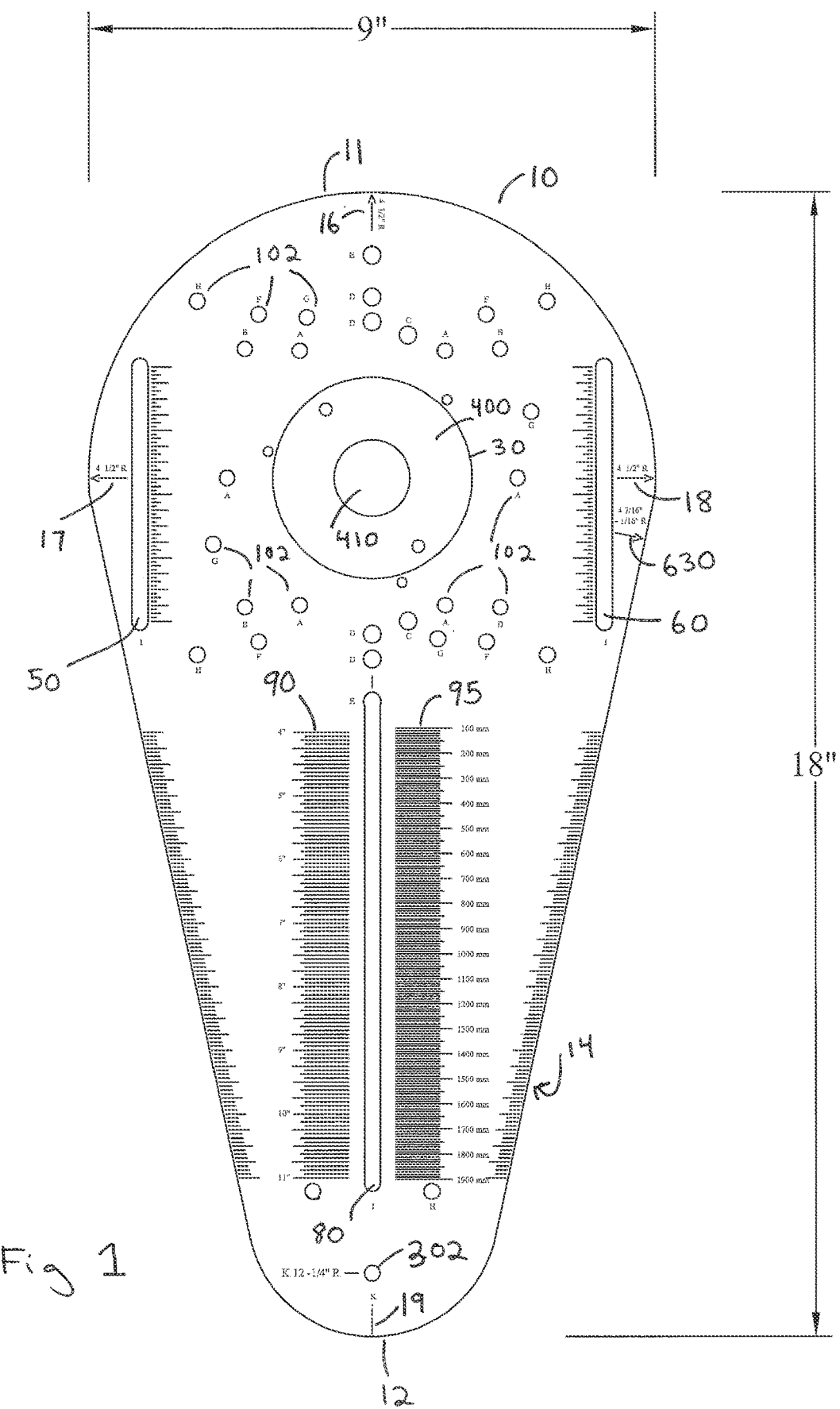
FIG. 1 is a top view of the router base.

As shown in FIG. 1, in an embodiment, an extra-large, optimally-sized offset extended router base 10 is provided that measures approximately 9" by 18" and is machined of high-grade anodized aluminum, which is strong, flat, lightweight, and eliminates flexing. In a preferred embodiment, the bottom surface 14 of the base 10 is machined flat.

In an embodiment, such base 10 has a large rounded end 11 of uniform radius, and a narrower opposite end 12. The base has a central opening 30 with parallel slots 50 and 60 on each side of the opening 30, and a slot 80 in line with the opening 30. Reference marks 16, 17 and 18 are machined into the surface of the base, to allow the router to be guided to points on a workpiece without the user having to visualize the location of the bit. In a preferred embodiment, such lines are through the axis of rotation of the bit 120, as shown in the next described FIG. 2. Such lines can be used as start or stop point guides for various router operations.

As shown in FIG. 2, the large end 11 of base 10 has holes for mounting a router 100, and a hole 302 at the narrow end 12 for mounting a handle 300 with a threaded fastener 301. The bottom surface 14 of the router base is shown. The base 10 has variously spaced holes 102 for mounting routers with varying mounting configurations holes, such as 103 in the router 100 shown. The router 100 is secured to the base 10 by threaded fasteners 101.

In another embodiment, various universal mounting holes 102 as shown in FIGS. 1 and 2 are provided so as to fit most routers and accessories, which typically have threaded holes 103 in the bottom. The holes 102 in the base 10 are flat bottom, and counter sunk with over-sized bore allow the concentric alignment of any router to the opening 30 of the base 10 by threaded fasteners 101 into the threaded holes 103 of the router 100.

The router 100 is fastened to the base 10 such that a cutting bit 150 of the router passes concentrically through the opening 30 of the base 10. In known operation of the router, the bit spins such that the axis of rotation 120 of the bit 150 is perpendicular to the base 10 and passes through the opening 30. In an embodiment, this axis of rotation is centered in opening 30.

Router bits can be made of various materials and shapes and the present embodiments can be used with various bit shapes, profiles and configurations. For purposes of illustration, the figures and description herein generally refer to a straight cutting bit of a given size, but the claims and descriptions are not intended to be limited to a single bit, and the embodiments described and variations of same can be used with various router bits of various sizes, materials, profiles and configurations.

As further shown in FIG. 2, a large removable template guide plate 400 can be provided to maintain safe and stable cuts when using large diameter router bits such as described below in the embodiment of FIG. 14B. Prior known bases are limited in the size of the removable center disks. Such template guide plate can also be adopted to accept template guides for various router operations as will be described.

The improved design adds surface area to a router for greater stability, safer operation and more controlled cutting. High machining tolerance avoids slop or wiggle that is sometimes found in existing router base designs and standard template guides.

FIG. 3 is perspective view of the base 10 with a template guide plate 400 and a template guide 500, fit into opening 30 for certain preferred uses of the base, such as template routing, a process known in the art where a bit 150 is guided around a surface or template by providing a concentric surface 505 of a template guide 500 that is concentric around the router bit, and guiding such surface against the surface of the template.

As further shown in FIG. 3, in a further embodiment for such template operations, a template guide plate 400 is provided, which is secured to the base 10 with screws 401. In an embodiment, the template guide plate has a stepped edge 420 that mates into a stepped recess 15 in the base 10 so that the template guide plate 400 is seated flush with the bottom surface 14 of the base 10.

A template guide 500 is provided that is inserted into an opening 410 in the template guide adaptor. In an embodiment, the template guide 500 is secured to the adaptor by a threaded knurled ring 510. The template guide is sized appropriately to allow the router bit 150 to pass through the openings 30 and 410 in the base 10 and template guide plate 400, respectively. In an embodiment, the lower portion 505 of the template guide 500 has an outside dimension of 1". In use, this portion protrudes below the surface 14 of the base 10 and can provide a concentric surface for the router and base assembly to ride against in routing operations, as is known to one skilled in the art. In further embodiments, such template guides can have larger or smaller outside and inside dimensions.

In an another embodiment, a bushing 520 is provided that attaches to the lower portion 505 of the template guide 500. This allows the outside diameter of the template guide to be effectively enlarged by the appropriate sized bushing. Such bushing 520 has an interior dimension 522 matching the exterior dimension of the lower portion 505 of the template guide, allowing the bushing to be fit on the template guide. In an embodiment, the bushing can be affixed by a set screw 521, and in other embodiments, by a pressure fit, O-rings, threads or other known means.

The template guide plate 400, template guide 500, and bushing 520 are sufficiently rigid to hold their shape and concentricity, and with respect to the template guide and bushings, provide a reduced friction surface to register and slide along a fence or workpiece. In an embodiment, the bushing is aluminum. In other embodiments the bushings can be steel, brass, bronze, phenolics, wood, plastics or other materials. The bushings can also be ball bearings rings, further reducing friction between the bushing and workpiece.

In still further embodiments, a similarly fashioned solid template guide plate 400 without hole 410 can be made from a material such as phenolic that can be routed to create a close fitting plate to a router bit.

In accordance to other embodiments, the template guide 500 can be provided with extra-large 1½" & 2" removable bushings, to offset a router bit to either side of a cut. In an embodiment, the bushing is secured to template guide 500 by set screw 521. This allows the outer diameter of the template guide 500 to be effectively enlarged without removing the busing from the template guide 500, or the bit 150 from the router 100.

In the woodworking arts, a worker will often take two or more passes to make a final cut, with the later passes preferably being thinner or removing less material so as to make a final and smoother finishing pass. To achieve these two passes with a router, the guide surface from the bit to the surface to be indexed against must be incrementally different for each pass. To achieve different distances of the guide surface to the router bit, it is known to change the template guide or bushing size, or alter the distance of a fence from the bit.

In one embodiment here, the router base allows a user to take differentially spaced passes without changing bases, altering fence placement or exchanging template guides or bushings.

In another aspect, two different registration edge sides are provided for quick reduction cuts. These registration edges can be on the curved or flat portion of the base.

FIGS. 4A and 4B show an example of an embodiment where two successive cuts with a router are made using offset registration edges of the base 10. In such an embodiment, the radius of an edge 13 of end 11 of the base 10 from the axis of rotation 120 of the router bit 150 is 4½", and edge 40 of base 10 is straight and offset a distance of 4⁷⁄₁₆" parallel to a line that extends through the axis of rotation 120. In this configuration, a first cut is made running the edge 13 of the base 10 as a registration surface against a fence 600, as shown in FIG. 4A. This creates a cut where the center of the cut is 4½" from the axis of rotation, and the edge of the cut is 4½" plus the radius of the bit 150. By taking a second cut using the straight side edge 40 of the base as a registration surface that is machined with a distance of 4⁷⁄₁₆" from the axis of rotation 120, the user can make a second cut with the same fence set and an additional ¹⁄₁₆" will be removed. This allows a roughing and finished cut to be made. In an embodiment, the distances for these registration surfaces are indicated on the base with machined marks 16 and 630, respectively. In routing operations, it is advantageous to take a final shallower "finishing cut" to avoid burning or tear out and to create a smoother finished surface. Thus, in the present aspect, there is no need to move and reset a guide fence for a second finer cut, which makes for faster, more efficient and accurate cuts.

Figure 5:
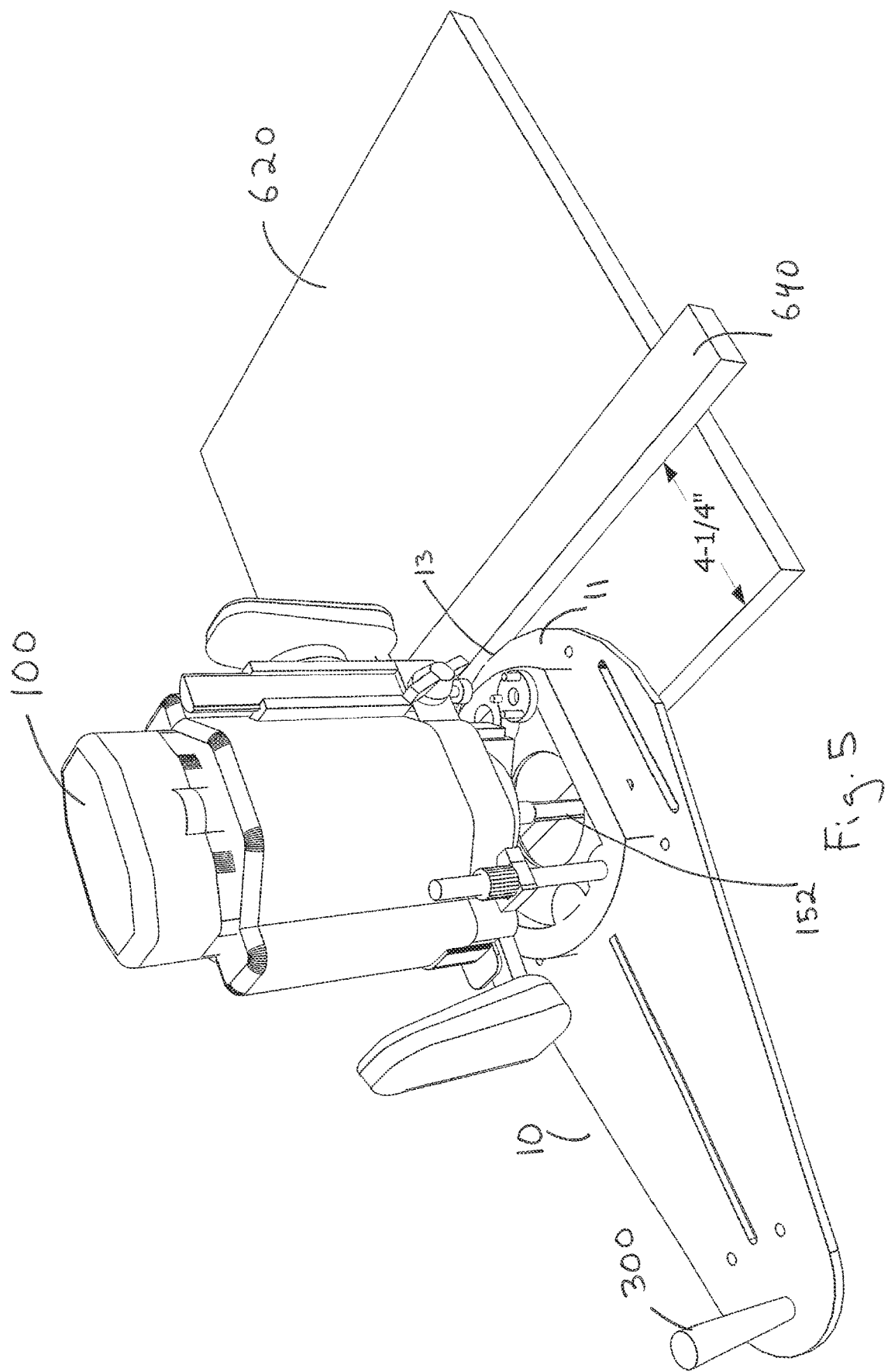
FIG. 5 is a perspective view of the operation of the router base oriented in a first position to a fence.

As further shown in the embodiment of FIG. 5, when using a ½" diameter bit 152 in router 100, a first cut is made using edge 13 of end 11 of base 10 as a registration surface against a fence 640 affixed to workpiece 620 by commonly used means such as temporary glue, tape, clamps, nails or screws. As a consequence of the distance between registration surface is 4½" away from the axis of rotation of bit 152. As the perimeter of ½" radius bit is ¼ inch away from the axis of rotation 120, this creates a cut pf workpiece 620 that is 4¼ inch away from the fence.

Figure 6:
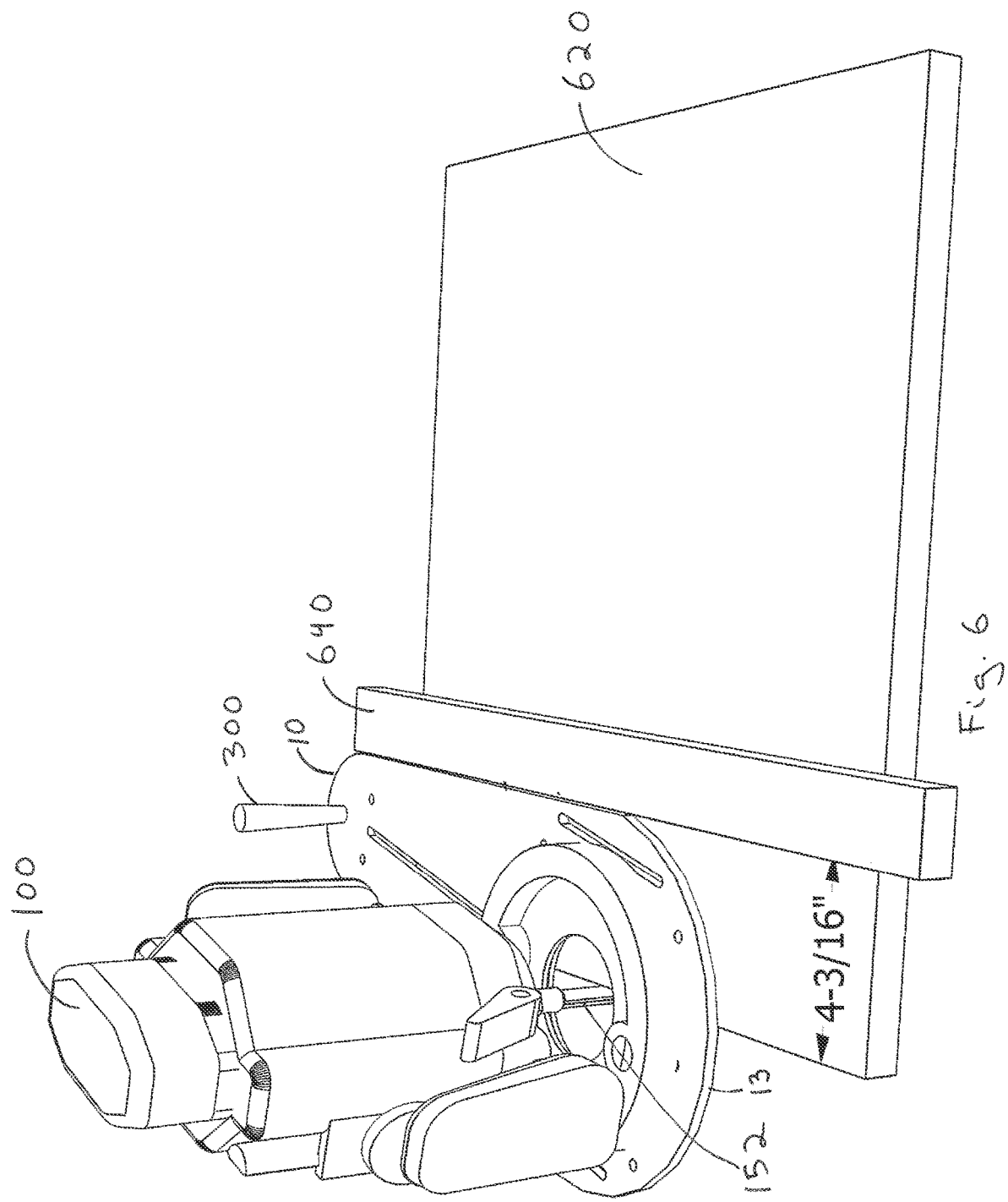
FIG. 6 is a perspective view of the operation of the router base oriented in a first position to a fence.

As shown in FIG. 6, when a second cut is made with fence 640 positioned in the same position on workpiece 620, but the base 10 is registered against edge 40 of the base 10, which is 4⁷⁄₁₆ inches away from the axis of rotation 120, a second cut is made which creates a cut of an additional ¹⁄₁₆", creating a cut that is 4³⁄₁₆" from the fence 610. As used herein, the reference to an edge or surface are used interchangeably as understood by one of skilled in the art in the context of the description, and are not intended to be limiting.

For the embodiments in FIGS. 4A, 4B, 5 and 6, it is possible to use the offset registration surfaces in straight or curved surfaces, as needed by the user.

The feature of the offset registration edges of the router base can also be used for forming grooves, where the offset edges are used in tandem to fine tune or finish cut the width of a groove such as a dado or dovetail.

In embodiments, the first and second registration edges can be on either or both the straight or curved edges of the base. That is, the registration edges could be both on a curved portion of the base, or both on the straight sections of the base, depending on the application. In a further embodiment, the registration surfaces need only be offset from the rotational center of the bit.

In a further embodiment, a third or more registration surfaces could be used for further incremental cuts. Or multiple registration edges may be provided allowing groves to be made with a known bit size. For example, with a known bit size, two registration edges could be made on the base labeled A and A+¼, where A+¼ are offset by ¼ inches. Then using a known bit size of ½ inch, a ¾ grove could be made with a ½ bit by first routing with registration edge A and then routing with registration edge A+¼, creating a ¾ grove. By way of further example, other registration surfaces could be provided, such as A+½ allowing a ½ bit to accurately cut a 1" grove by using registration surfaces A and A+½.

In known routing operations the base of a router is attached to a pin inserted into a hole the surface to be routed or a to a piece attached to the surface to the routed so the surface need not be drilled to accept the pin. In such operations, the router base is provided with a hole, or a hole is made in the base to accommodate the pin, and in operation of the router, the base is rotated around the pin to make a circular cut.

Figure 7:
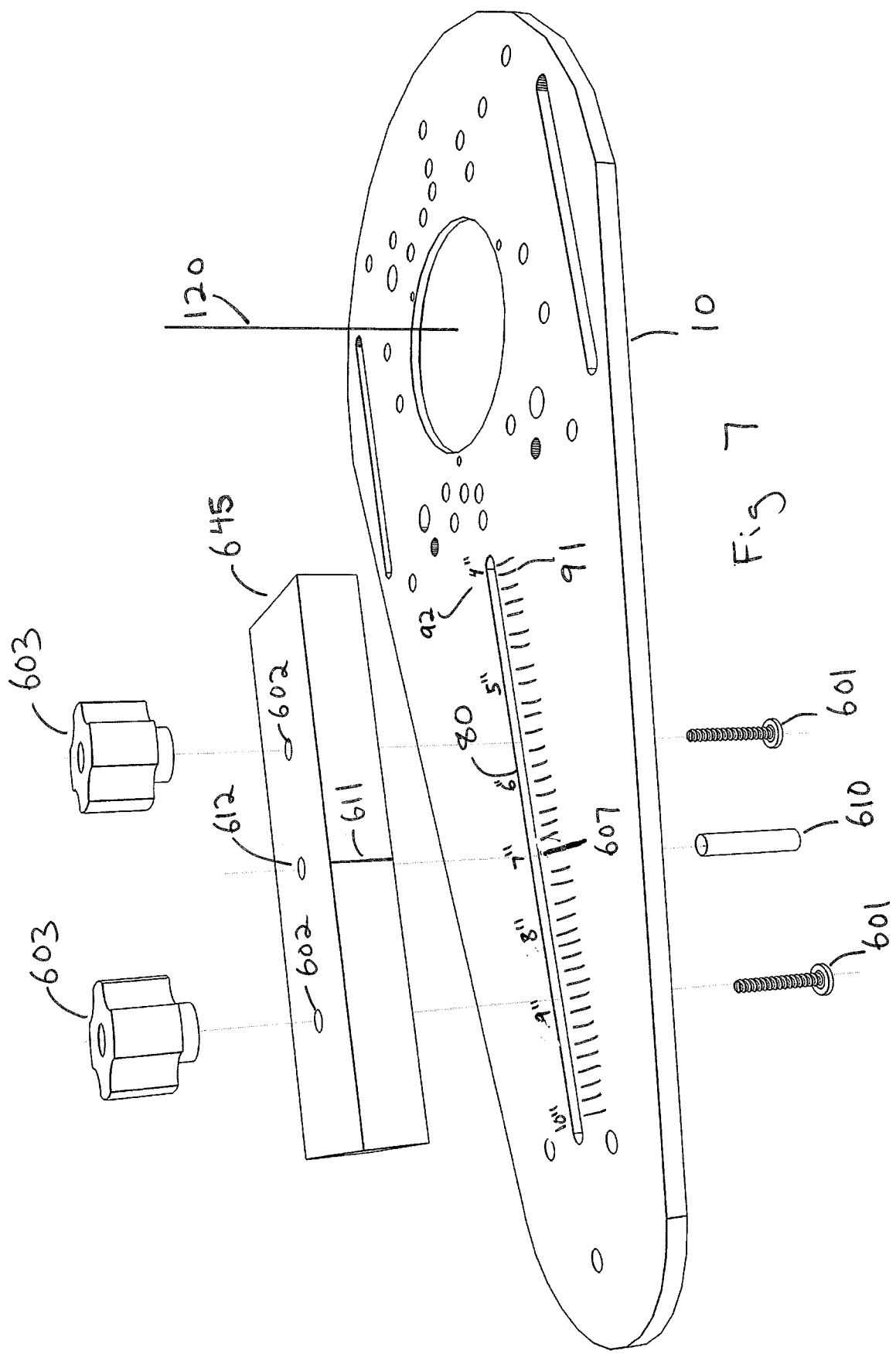
FIG. 7 is a perspective view of the router base with an attachment for a pivot pin.

In an embodiment shown in FIG. 7, a pin attachment mechanism is provided to allow base 10 to be rotated to make circles, circular profiles, and groves without the need for drilling holes in such base. In one such embodiment, the base has a slot 80 running in a direction generally axially from the rotational axis of rotation 120 of the bit. A pivot block of wood or other material 645, with two or more holes 602 is placed above the slot. Fasteners 601 are threaded from the underside 14 of the base 10, through the slot 80 in the base, and into the pivot block 645, and secured by thumb screws 603.

As shown in FIG. 3, the underside of slot 80 has a recess 81 to allow the heads of the fasteners 601 to be secured below the bottom surface 14 of the base 10.

As shown in FIG. 7, the block 645 has one or more holes 612 for a pin 610 that would extend through the slot 80 in the base 10, and mate into a surface to be routed. Such an arrangement allows allow the base 10 to rotate around the pin 610, either by the pin rotating in the surface, the base rotating around the pin, or a mixture of both. Pin 610 is preferably made of metal. In operation, the pin 610 is used to create a rotational pivot point for the base to rotate over the material to be routed, and preferably is tightly fitted in the hole in the surface to be routed, and hole 612, to allow base 10 to be rotated around the pivot point without slop, thereby creating an accurate arc of rotation.

In an embodiment, the pivot block 645 can slide along the slot 80 to allow the pin to be moved relative to the router bit axis 120. In an embodiment, the location of the pivot block 645 for routing operations is accomplished by tightening the fasteners 601 via thumb screws 603, nuts or similar means, thus allowing for incremental adjustment of the radius of rotation.

In an embodiment, an indexing line 611 is provided on pivot block 645, or drawn by the user, so that an accurate reference can be made to the scale 91 of the base 10, or depending on the user, an imperial 92 or metric scale. In a preferred operation, the user places the pin in an approximate location and draws the indexing line along scale 91, at for example the 7" mark 607. Then, the user routes a test piece and determines the distance and whether the block 645 and thus pivot point 612 needs to be adjusted, if necessary. To make the adjustment, pivot block 645 is moved using the reference scale 91 as a guide.

In an embodiment, the scales 90 and 95 as shown in FIG. 1 can be used to indicate the distance from the axis of rotation 120, and as shown in FIG. 3 the index line 611 is made in line with the pin hole 612. In this configuration to radius of the pivot pin 610 around the axis of rotation 120 can be accurately set.

Figure 8:
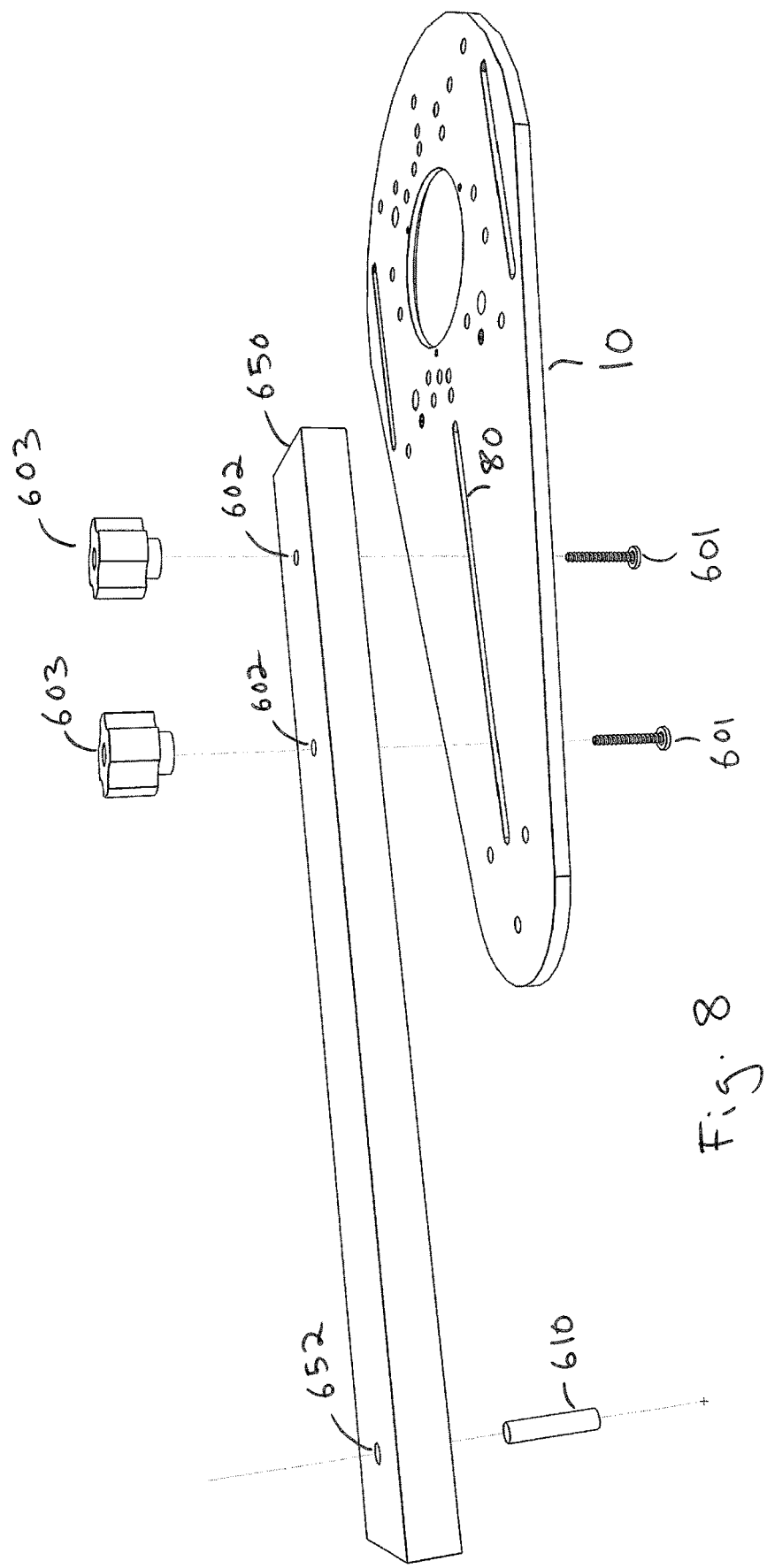
FIG. 8 is a perspective view of the router base with a second attachment for a pivot pin.

As shown in FIG. 8, in a further embodiment, a longer pivot block 650 pivot block can be adapted to provide the capability of larger radius cuts. In this embodiment the pivot hole 652 is positioned beyond the ends of the slot 80 allowing radius larger than the size of the base, and where needed, radius of many feet in length. In the preferred embodiment, such longer pivot block 652 can be provided with the same indexing and adjustability as described in reference to FIG. 7, with like numbers in FIGS. 1 and 8.

Figure 9:
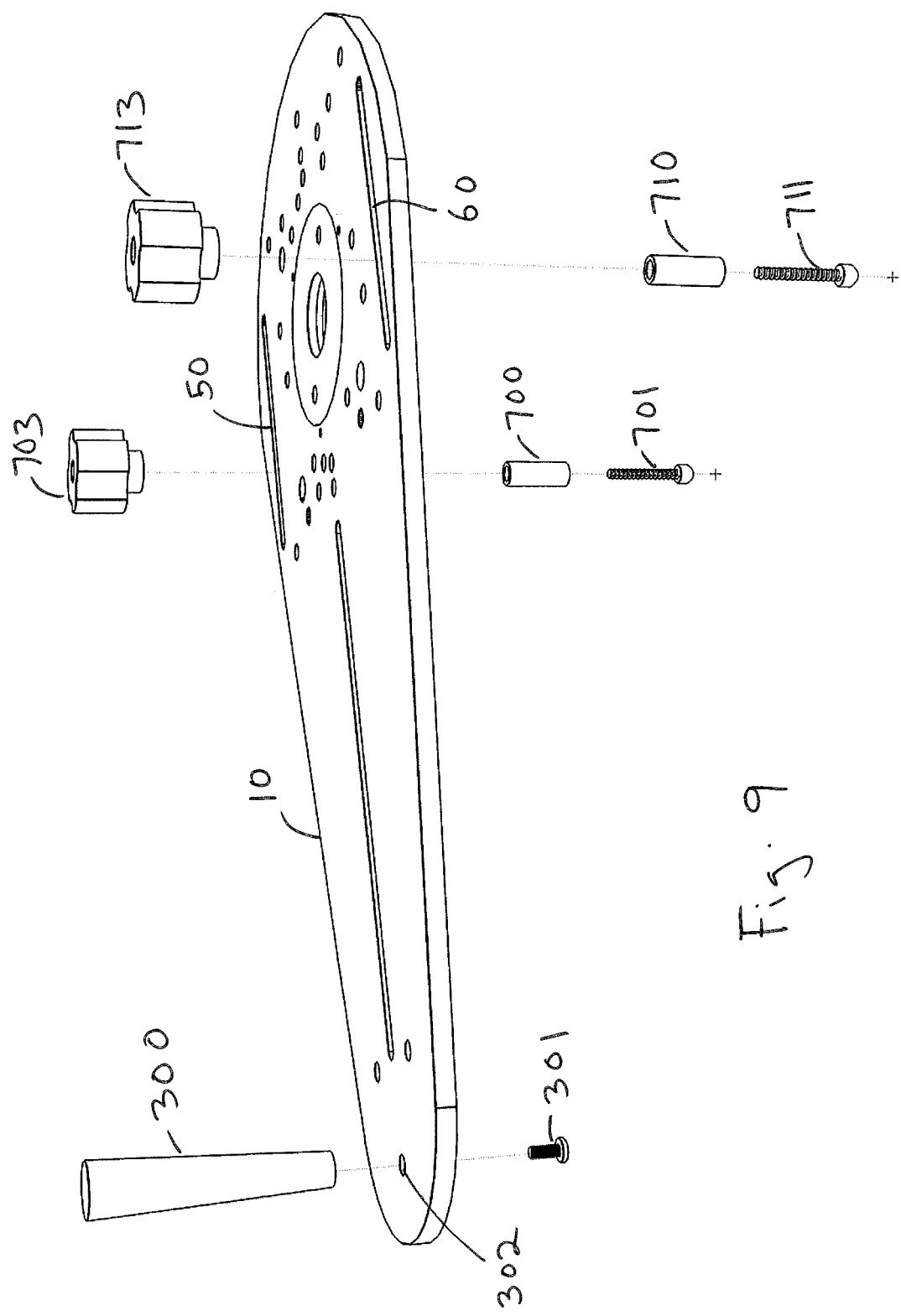
FIG. 9 is a top perspective view of a router base with guide pins in a first location.

As shown in the embodiment of FIG. 9, a user can place hollow guide pins 700 and 710 in the respective slots 50 and 60 to create a two-point curved fence guide. In such an arrangement, since the guide pins reference the work at two points, curved or radiused edges can be profiled, and the distance from cutter to machined edge is adjusted by moving the pins 700 and 710 along the respective slots 50 and 60, and fixating them in place by respective threaded fasteners 701 and 711, passing through the pins 700 and 710 and slots 50 and 60, respectively, and tightened by thumb screws 703 and 713. In a further preferred embodiment, the placement of one or more of the guide pins 700 or 710, can be incrementally moved, or larger diameter guide pins can be provided between passes, to allow coarse and fine cuts as described above.

Figure 10:
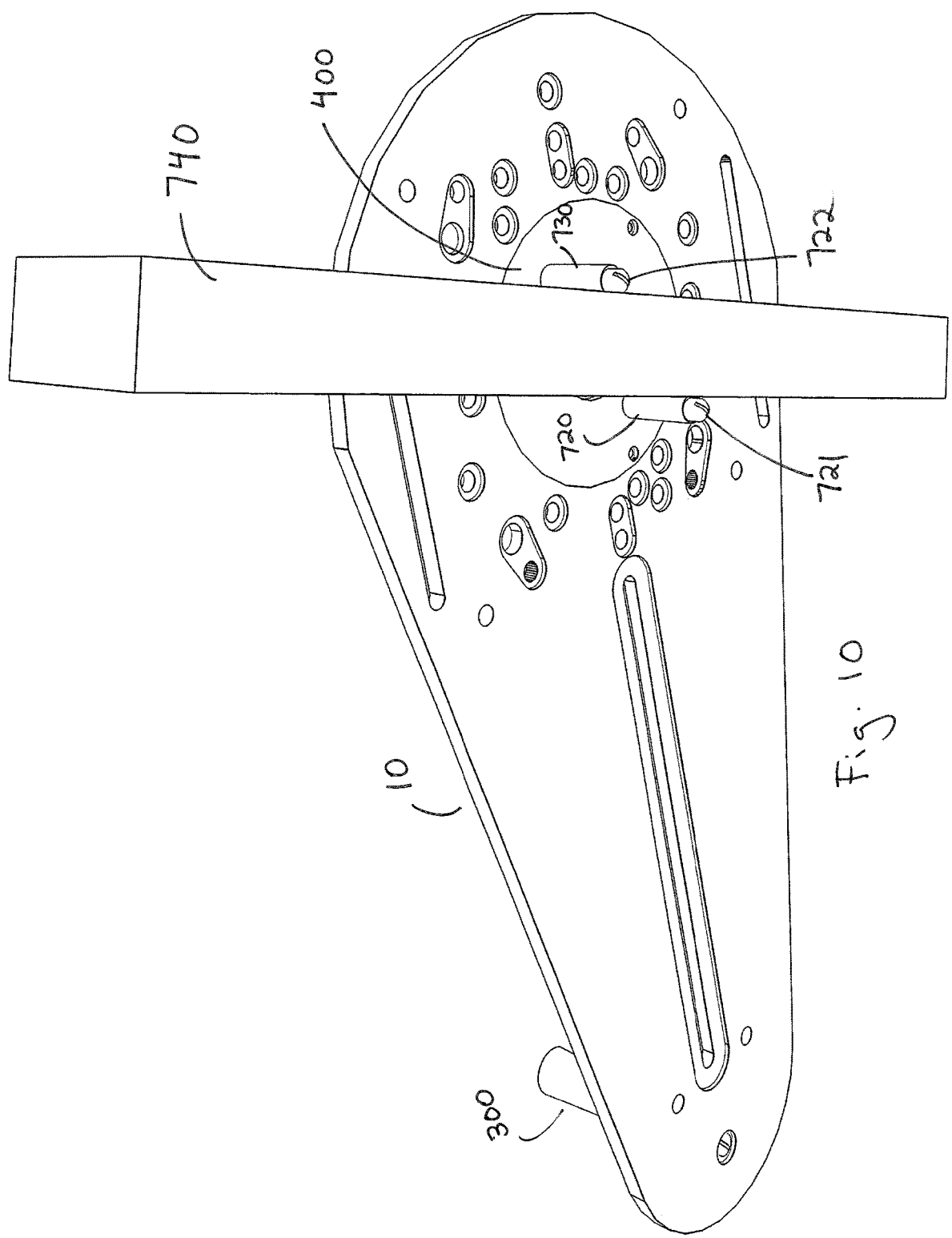
FIG. 10 is a underside perspective view of a router base with guide pins in a second location arranged on a workpiece.

As shown in FIG. 10, in another embodiment, hollow guide pins 720 and 730 can be attached by fasteners 721 and 722 respectively, into symmetrically placed threaded holes across the opening 410 of template guide plate 400 to create self-centering registration for mortise or slot cuts on workpiece 740.

Figure 11:
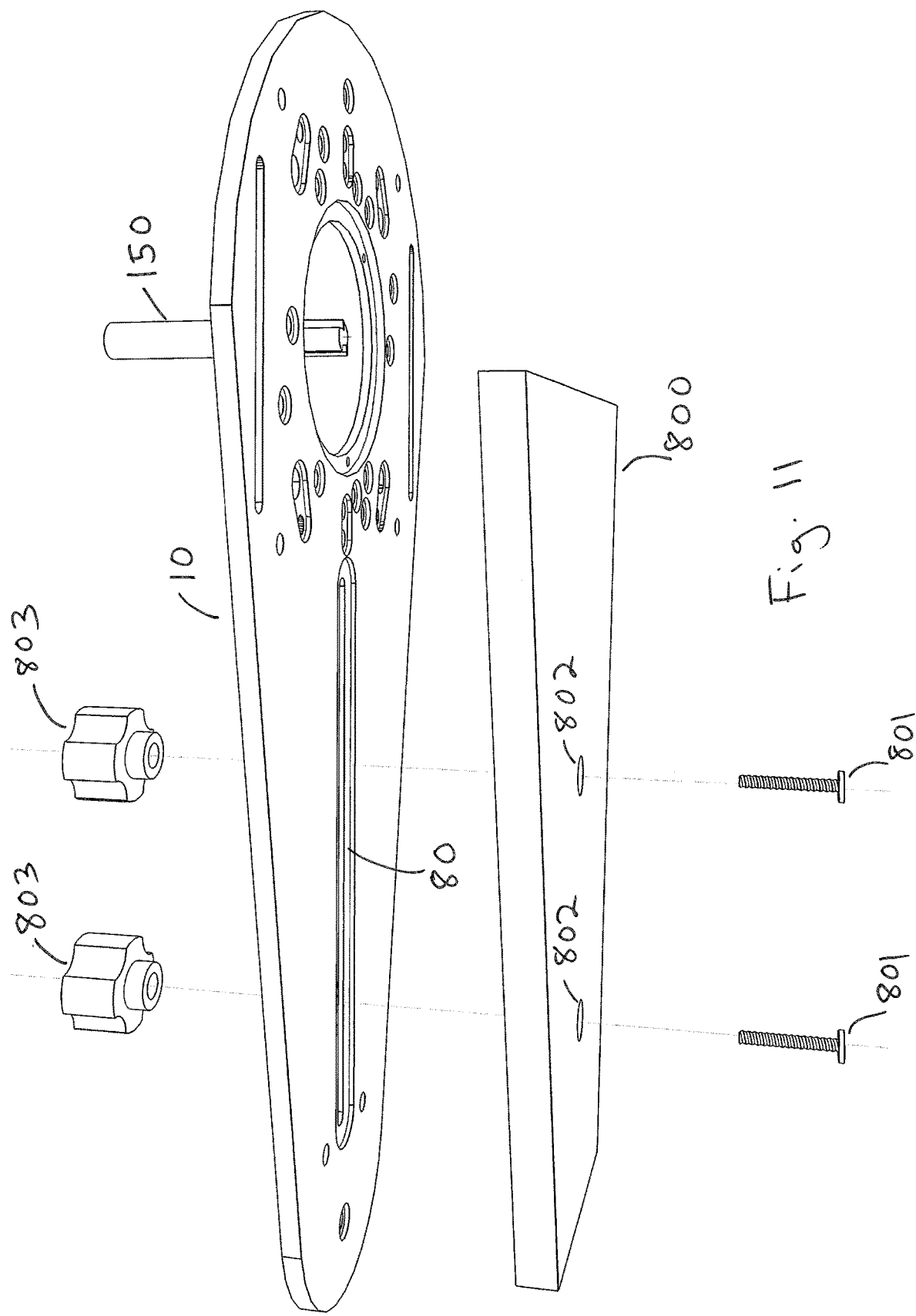
FIG. 11 is a perspective view of a router base with a shim sheet.

In another embodiment, the holes and slots in the base are arranged to allow a variety of fences for fixtures to be used with the base. For example, in the embodiment in FIG. 11, a shim sheet 800 is attached to the base 10 by threading fasteners 801 through respective holes 802 in the shim sheet 800, through the slot 80 in the base 10 and attached by thumb screws 803. The shim sheet can be made by the user or provided with the base. Such shim sheet 800 allows the router 10 to be operated on top of a workpiece, with the shim sheet 800 riding on the surface of the workpiece and the bit 150 cutting into the same surface to machine an added edge to a workpiece so that it is level with the work surface. The use of slot 80 allows lateral adjustment of the shim sheet as described herein. Such an embodiment can also be uses to flatten inlay, butterfly joints, defects, adhesive residue, or other protrusion from the workpiece.

Figure 12:
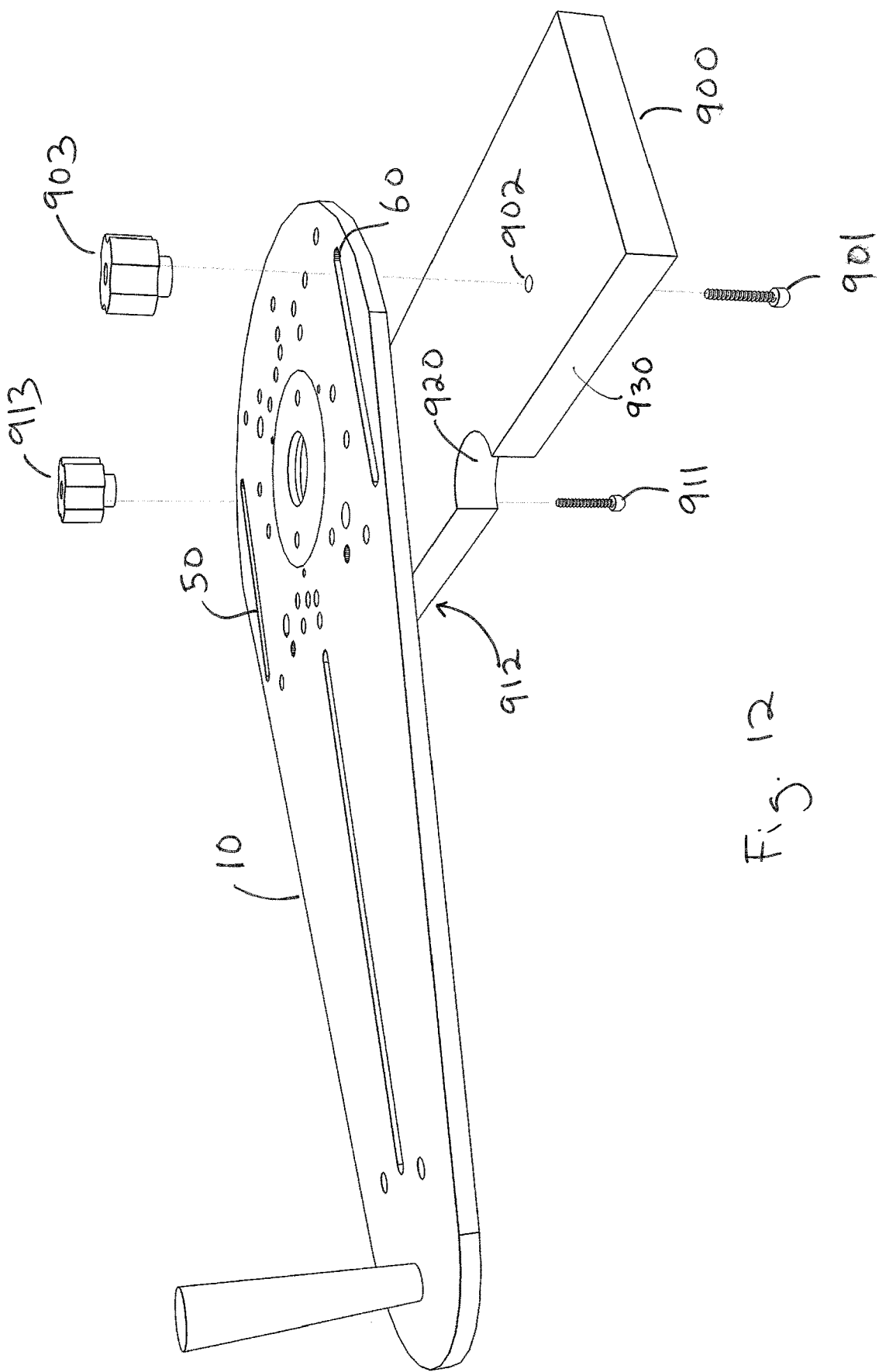
FIG. 12 is a perspective view of a router base with an adjustable fence.

In another embodiment shown in FIG. 12, a straight fence 900 is attached to the base 10 by threading fasteners 901 and 911 through respective holes 902 and 912 (hole 912 being obscured by the base in this figure) in the fence 900, through the slots 60 and 50 respectively, and fastened by thumb screws 903 and 913, respectively, to the base 10. Fence 900 has a cutout 920 so that the plane of edge 930 of the fence 900 extends within the diameter of the router bit. This embodiment allows the fence to cover a portion of the bit, reducing the cutting depth of the bit allowing modified profiles or depth adjustment with precision adjustability of the cut and providing in preferred embodiments a zero-clearance fence for cleaner cuts.

Figure 13:
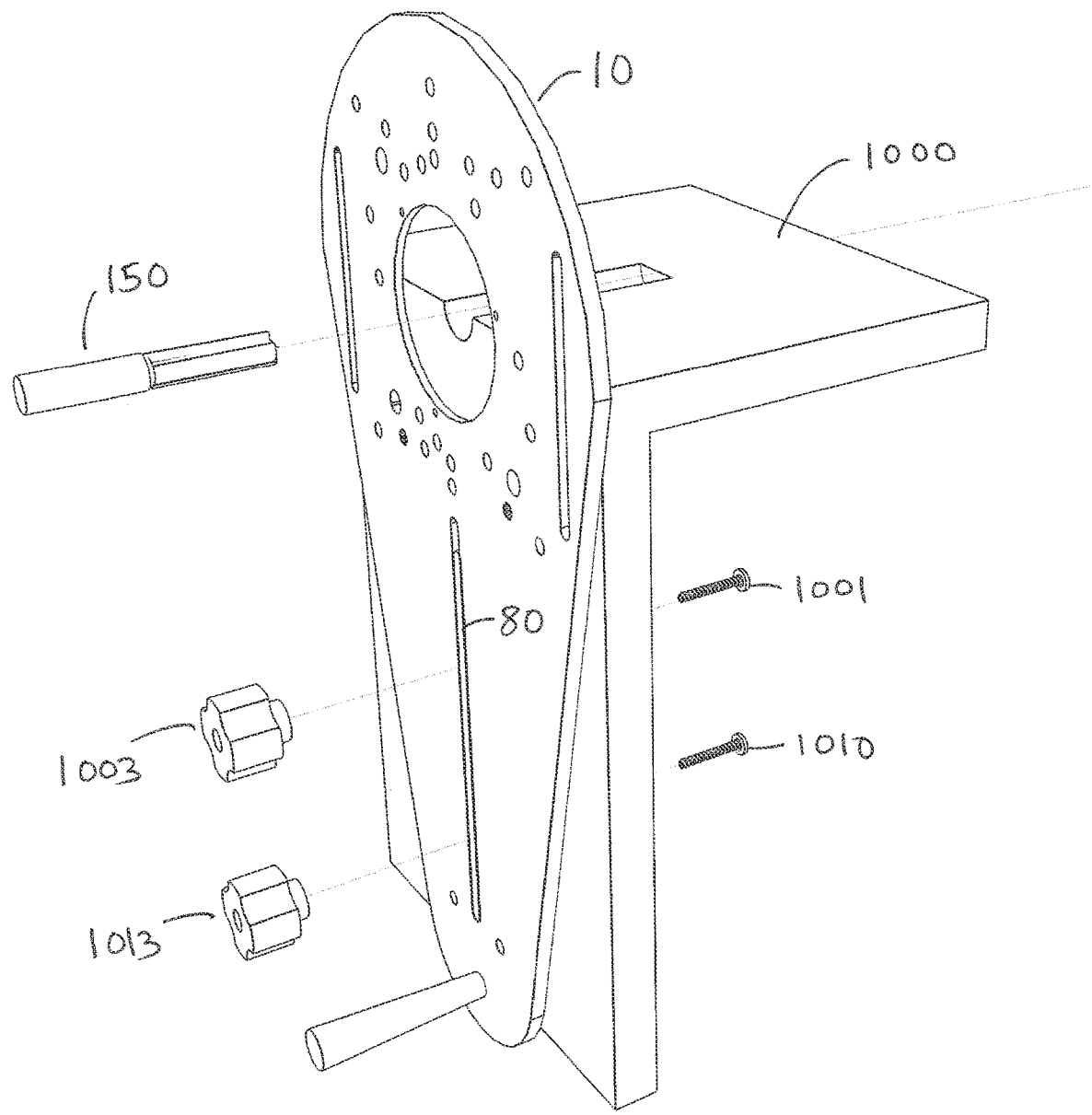
FIG. 13 is a perspective view of a router base arranged for a cut with a vertical fence.

In the embodiment shown in FIG. 13, a vertical fence 1000 can be attached to the base 10 that is adjustably fastened through the use of fasteners 1010 and 1001 through holes in the vertical fence and slot 80 of base 10, fixed by thumb screws 1013 and 1003, respectively. Such vertical fence allows the horizontal use or placement of the router 100 and bit 150 or for holding the router in a vise.

Figure 14A:
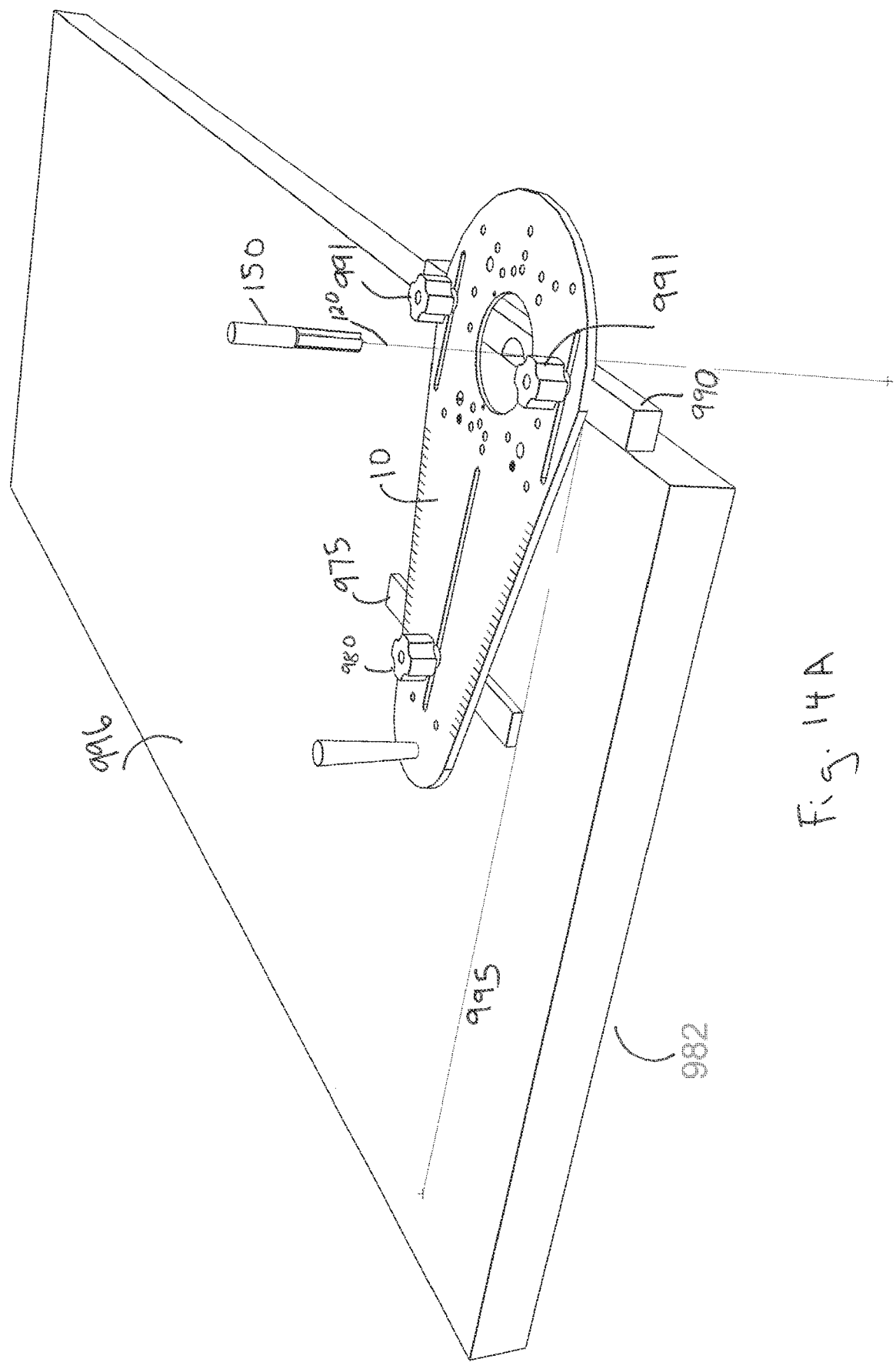
FIG. 14A is a perspective view of a router base positioned for an angled cut to the edge of a workpiece.

In most operations of a router, it is desirable that the axis of rotation of the bit is perpendicular to the surface of the base. A user often wishes to machine a bevel on a door edge, or form a bezel on table top. For such operations the base would need to be positioned on an angle relative to the surface. As shown in FIGS. 14A and 14B, in a preferred embodiment, a shim block 975 is provided which is adapted to be fastened to the base 10, by a fastener, mounted through slot 80 and fixed by thumb screw 980. Such shim block allows the router base to be precisely and adjustably tilted relative to the work piece As shown in FIG. 14A, the shim block 975 is adjustably fixed by laterally moving the fastener system in the slot 80. Such fastener system includes a fastener that extends through the shim plate slot 80 and thumb screw 980 similar to the fastening mechanism described above. As the shim block 975 is moved closer to the axis of rotation of the router bit, the angle of the base 10 relative to the surface 996 or a workpiece 982. Conversely, as the shim block 975 is moved further away from the axis of rotation 120 along the slot 80, the angle is decreased. When the router 100 is operated with the shim block 975 in place, the axis of rotation 120 of the bit 150 is angled relative to the plane 995 of the surface 996 that the base 10 and shim plate 975 assembly is placed upon.

A fence 990 is provided and fastened to the base 10 through slots 50 and 60, with fasteners and thumb-screws 991, generally as described with reference to FIG. 12. Such fence allows the bit to be guided along the surface to be routed.

This angled operation of the bit can be used for various operations, including angled cuts with straight bits, modification of profiled cuts with profile bits, or creation of bevels in a surface by routing with the bottom surface of the bit, such as by use of the surfacing bit 151 shown in FIG. 14B.

Preferably, the thickness of the shim block 975 is fashioned such that the middle of the range of movement of the block creates a 2 degree bevel. In further embodiments, the shim block has greater or lesser thicknesses, allowing various other ranges of tilt. In a further embodiment, scales 75 and 70 are provided on the base 10, to allow precise arrangement of the shim block without test cuts.

Such an embodiment as shown in FIGS. 14 A and B, can also be combined with other embodiments herein, such as where a pivot point is used to route an arc as shown in FIGS. 7 and 8, or a fence 990 is used to guide the router, such fence generally of the form as described in FIG. 12.

Figure 15:
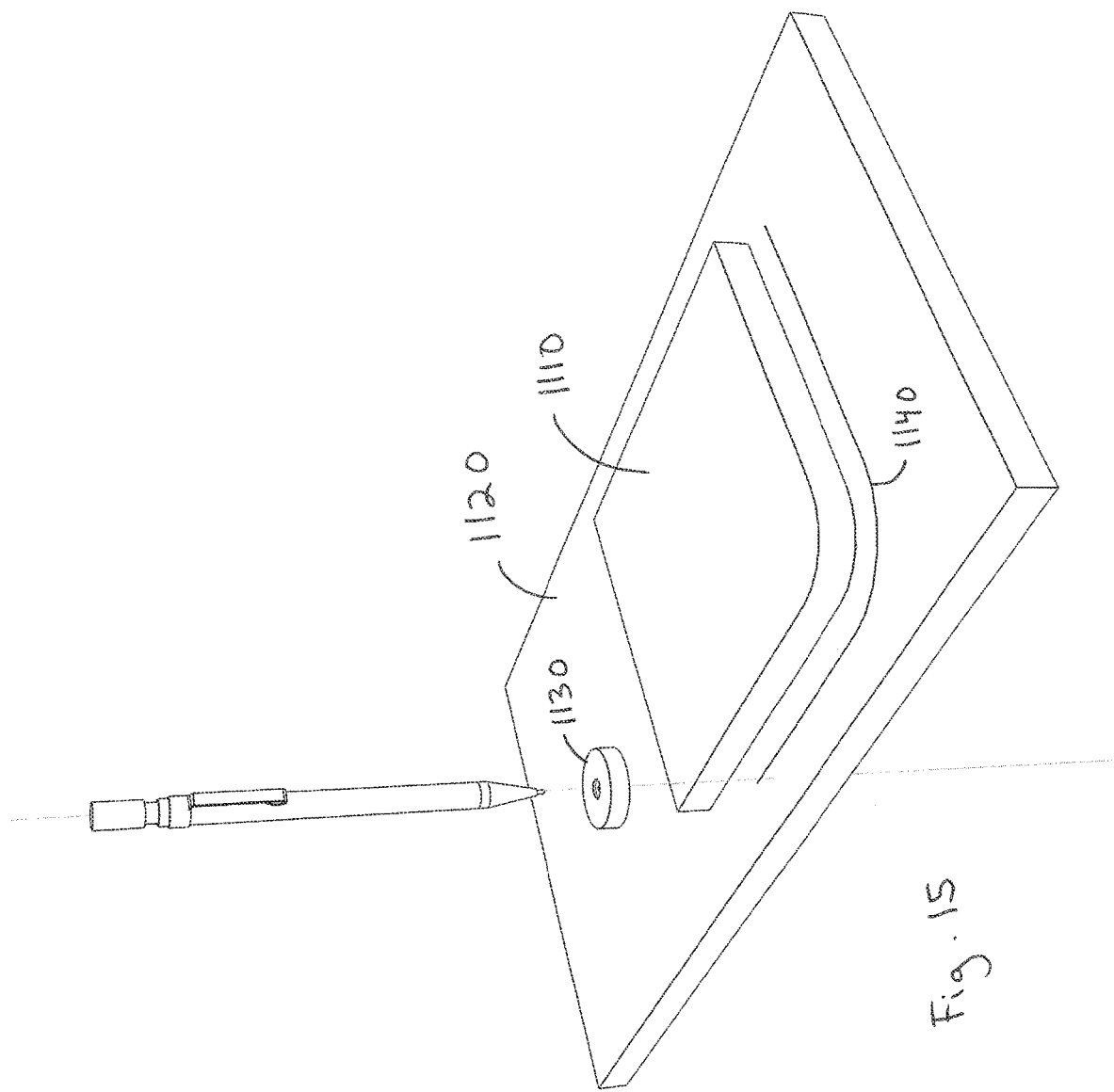
FIGS. 15 and 16 are perspective views of a drawing disk.
Figure 16:
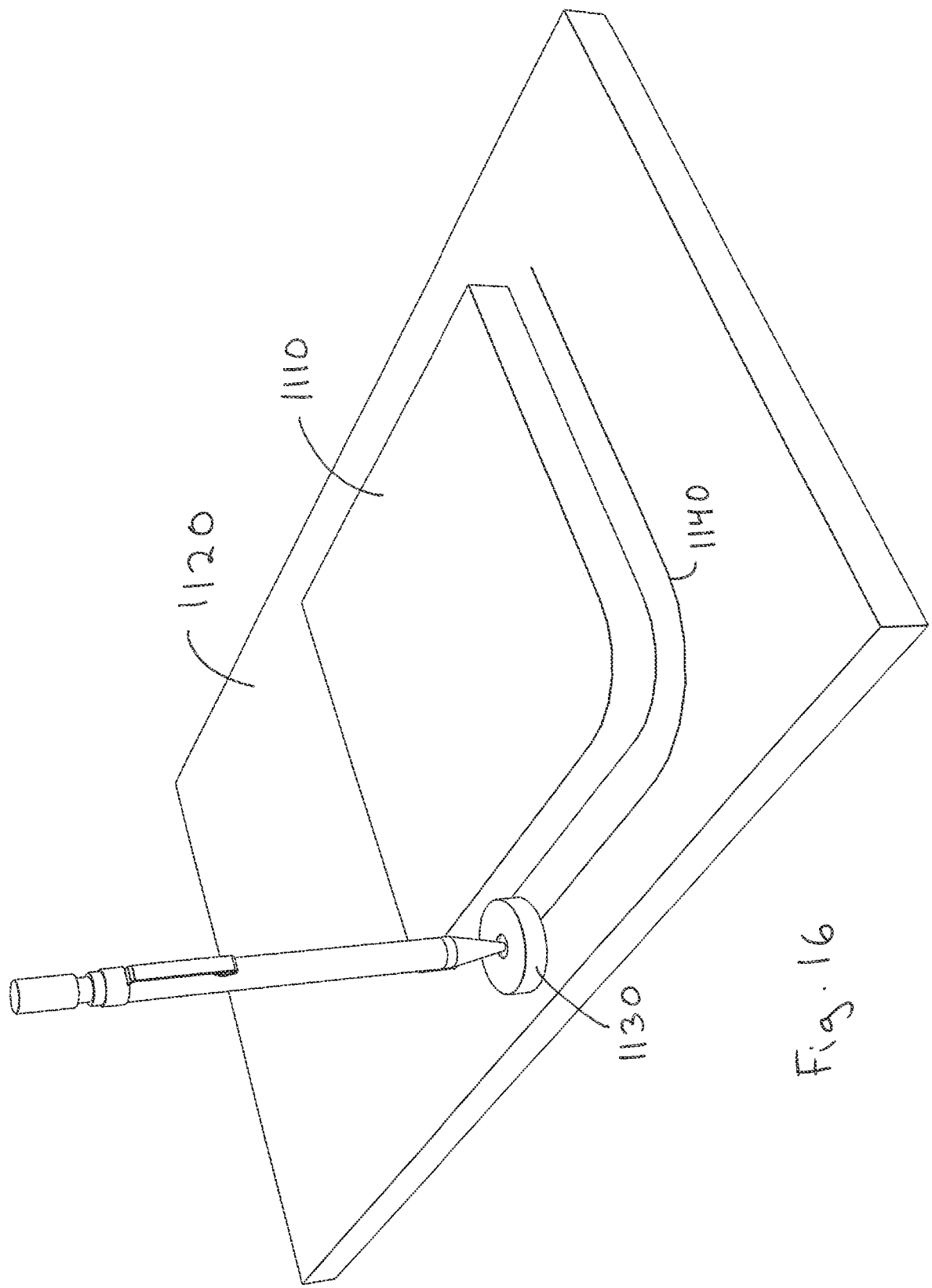

As shown in FIGS. 15 and 16, in another embodiment, a ½" parallel drawing disk 1130 can be provided that allows the user to draw lines 1140 on a workpiece 1120 that are parallel and offset by ½" from the cutting edge template 1110, which aids in precise layout and lets the user accurately precut excess material prior to routing operation. This advantageously allows the user to precut the workpiece so only a limited amount of material needs to be removed, making the router operation safer, faster, more efficient, with more accurate and cleaner cuts.

Figure 17:
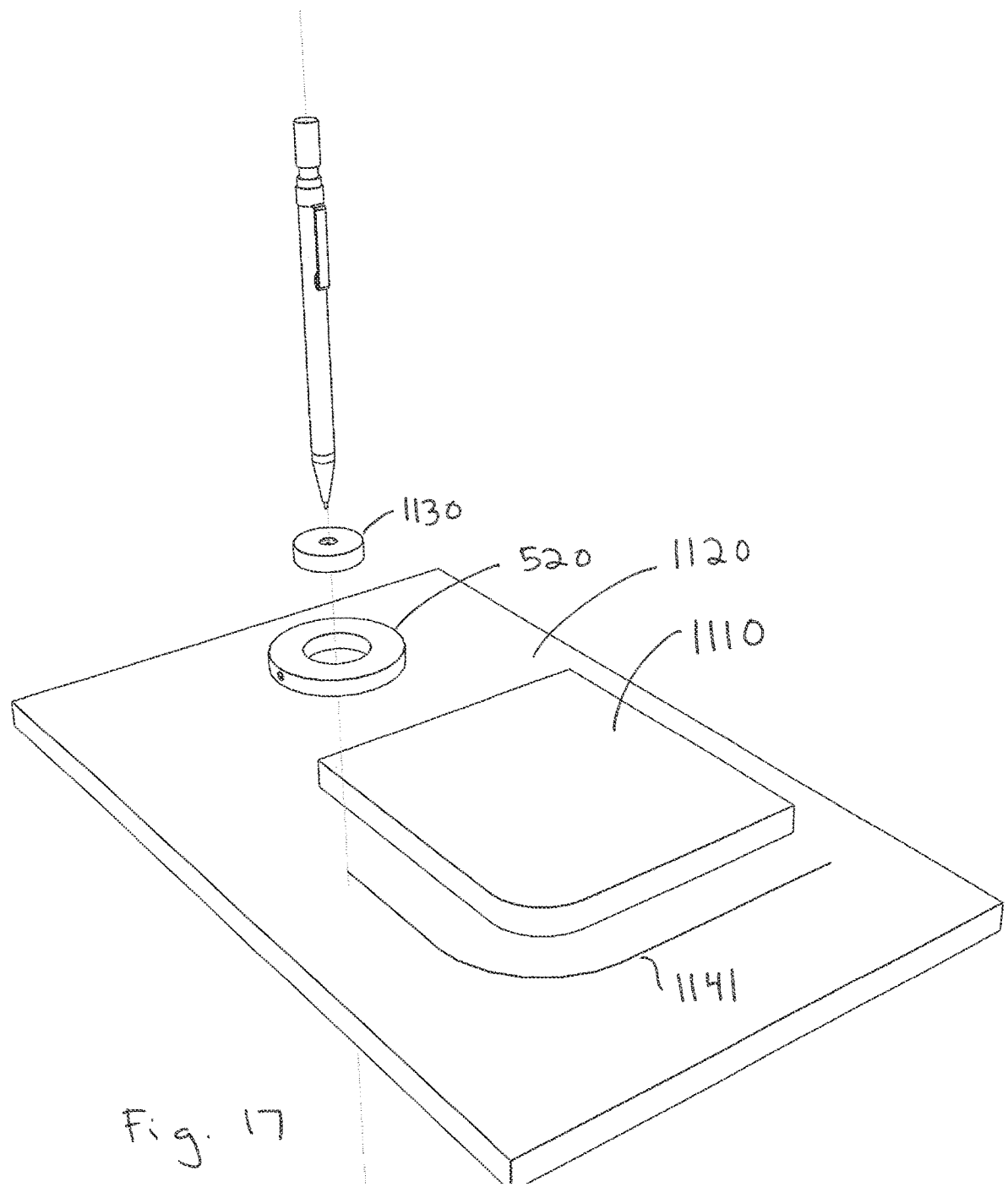

As shown in FIGS. 17 and 18, in an embodiment this disk 1130 has an outer diameter the same as the outer diameter of the plate guide 500 and also fits into the provided bushings 520 such as shown and described above, to allow a user to draw layout lines 1141 that would match the cuts made with the bushing 510. In an embodiment, the bushings allows the user to draw offset parallel lines at ½", ¾" and 1" from a template edge. Advantageously, a set can be manufactured such that the drawing disk matches the bushing sizes and cut can be made that accurately tracks a layout line.

Although the embodiments herein have been described, it is to be understood that these embodiments are merely illustrative of the principles and applications of the present technology. It is therefore to be understood that numerous modifications may be made to the illustrative embodiments and that other arrangements may be devised without departing from the spirit and scope of the present embodiments as defined by the appended claims.

The invention claimed is:
1. A base for a woodworking router having a cutting bit, comprising,
a generally planer base for attachment to a router, the base having a large end and having a narrow end opposite the large end;

an opening in said base to allow for penetration of a rotating cutting bit of the router, the opening defining an axis of rotation for the cutting bit;

more than one hole set in the base, each hole set comprising a multiple of holes and being centered on the axis of rotation to secure a router, said hole sets configured for routers having different arrangements of holes so that differently configured routers can be attached to said base;

a first fixed edge of the base, the first fixed edge being straight, parallel to a first line that extends through the axis of rotation, and offset from the first line by a first distance;

a second fixed edge of the base, the second fixed edge being straight, parallel to a second line that extends through the axis of rotation, and offset from the second line by a second distance, the second distance being different from the first distance; and the narrow end of the base having a hole for mounting a handle to the base, wherein the base includes a first mark indicating association with the first fixed edge, the first mark specifying the first distance, and the base includes a second mark indicating association with the second fixed edge, the second mark specifying the second distance, wherein the second distance is less than 0.25 inches smaller than the first distance, and wherein the router can be used to take a first pass on a surface indexed off of the first fixed edge, and a second cut on a surface indexed off of the second fixed edge.

2. The base of claim 1, wherein the first distance is 4½ inches and the second distance is 4 7/16 inches.

3. The base of claim 1, further comprising:

a third fixed edge, the third fixed edge being straight, parallel to a third line that extends through the axis of rotation, and offset from the third line by a third distance, the third distance being longer than the first distance.

4. The base of claim 1, wherein the first mark and the second mark are machined into the base.

5. A base for a woodworking router having a cutting bit, comprising, a generally planer base for attachment to a router;

an opening in said base to allow for penetration of a rotating cutting bit of the router, the opening defining an axis of rotation for the cutting bit;

more than one hole set in the base, each hole set comprising a multiple of holes and being centered on the axis of rotation to secure a router, said hole sets configured for routers having different arrangements of holes so that differently configured routers can be attached to said base;

a first fixed edge of the base at a large end of the base, the first fixed edge being shaped in a circular arc such that each point on the first fixed edge is offset from the axis of rotation of the cutting bit by a first distance;

a second fixed edge of the base, the second fixed edge being straight, parallel to a first line that extends through the axis of rotation, and offset from the first line by the first distance;

a third fixed edge of the base, the second fixed edge being straight, parallel to a second line that extends through the axis of rotation, and offset from the second line by a second distance, the second distance being different from the first distance; and a narrow end of the base opposite the large end of the base, the narrow end having a hole for mounting a handle to the base, wherein the base includes a first mark indicating association with the first fixed edge and specifying the first distance, and the base includes a second mark indicating association with the second fixed edge and specifying the second distance, wherein the second distance is less than 0.25 inches smaller than the first distance, and wherein the router can be used to take a first pass on a surface indexed off of the first or second fixed edge, and a second cut on a surface indexed off of the third fixed edge.

6. The base of claim 5, further comprising:

a fourth fixed edge, the fourth fixed edge being straight, parallel to a fourth line that extends through the axis of rotation, and offset from the fourth line by a third distance, the fourth distance being longer than the first distance.

7. The base of claim 5, wherein the first mark and the second mark are machined into the base.

* * * * *